US012577628B2

(12) United States Patent
Colomer Duran

(10) Patent No.: US 12,577,628 B2
(45) Date of Patent: Mar. 17, 2026

(54) METHODS FOR TANNING ANIMAL SKINS WITH DIALDEHYDES

(71) Applicant: DB PATENTS LTD., Birkirkara (MT)

(72) Inventor: Ramon Colomer Duran, Vic Barcelona (ES)

(73) Assignee: DB PATENTS LTD., Birkirkara (MT)

( * ) Notice: Subject to any disclaimer, the term of this patent is extended or adjusted under 35 U.S.C. 154(b) by 0 days.

(21) Appl. No.: 16/640,021

(22) PCT Filed: Aug. 22, 2018

(86) PCT No.: PCT/IB2018/056353

§ 371 (c)(1),
(2) Date: Feb. 18, 2020

(87) PCT Pub. No.: WO2019/038691

PCT Pub. Date: Feb. 28, 2019

(65) Prior Publication Data

US 2020/0291493 A1 Sep. 17, 2020

(30) Foreign Application Priority Data

Aug. 23, 2017 (IT) ........................ 102017000095318

(51) Int. Cl.
*C14C 3/16* (2006.01)
*C14C 3/28* (2006.01)

(52) U.S. Cl.
CPC .................. *C14C 3/16* (2013.01); *C14C 3/28* (2013.01)

(58) Field of Classification Search
CPC .................................... C14C 3/16; C14C 3/28
See application file for complete search history.

(56) References Cited

U.S. PATENT DOCUMENTS 1,814,836 A 7/1931 Lederman
2,941,859 A * 6/1960 Fein .................. A22C 13/0016 8/94.33

(Continued)

FOREIGN PATENT DOCUMENTS

CN 1043957 A 7/1990
CN 1159482 A 9/1997

(Continued)

OTHER PUBLICATIONS

Google Patents English translation of DE-10105574-A1, 6pages, Feb. 2001. (Year: 2001).*

(Continued)

*Primary Examiner* — Angela C Brown-Pettigrew
*Assistant Examiner* — Preeti Kumar
(74) *Attorney, Agent, or Firm* — MH2 TECHNOLOGY LAW GFROUP LLP

(57) ABSTRACT

A method for tanning an animal skin may include: (a) putting the skin in contact with a first tanning bath including at least one dialdehyde of general formula O═CH—$(CH_2)_n$—HC═O, wherein n is 0 or an integer number greater than or equal to 1 and less than or equal to 8, and wherein the first tanning bath has a pH greater than or equal to 1 and less than or equal to 5; (b) bringing the pH of the first tanning bath to a pH greater than 5 and less than 8; and/or (c) repeating one or more times the steps (a) and (b) on the skin coming from the step (b) using a second or further tanning bath. In the first, second, and further tanning baths, surfactants may be present in a total quantity less than 0.05% by weight relative to a pelt weight of the skin.

20 Claims, 2 Drawing Sheets

(56) References Cited

U.S. PATENT DOCUMENTS

Figure 1:
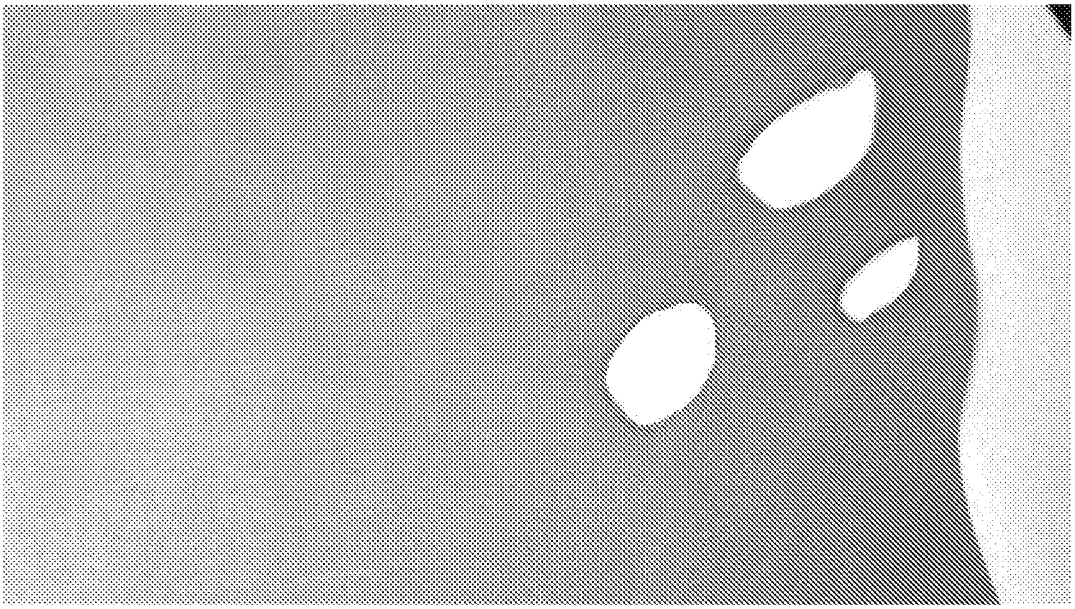

| | | | | | |
|---|---|---|---|---|---|
| 4,270,912 | A | | 6/1981 | Prentiss | |
| 5,011,499 | A | | 4/1991 | Rathfelder et al. | |
| 5,372,609 | A | * | 12/1994 | Weiser | C14C 3/16 8/94.18 |
| 5,492,539 | A | * | 2/1996 | Bauer | C14C 3/28 252/8.57 |
| 5,505,864 | A | | 4/1996 | Bauer et al. | |
| 5,733,340 | A | * | 3/1998 | Lauton | C14C 3/16 252/8.57 |
| 2009/0172890 | A1 | | 7/2009 | Huffer et al. | |

FOREIGN PATENT DOCUMENTS

| | | | | | |
|---|---|---|---|---|---|
| CN | 1863930 | A | | 11/2006 | |
| CN | 101525673 | A | | 9/2009 | |
| CN | 104818354 | A | | 8/2015 | |
| CN | 105506196 | A | | 4/2016 | |
| DE | 19906190 | A1 | | 8/2000 | |
| DE | 10105574 | A1 | * | 8/2002 | C14C 3/16 |
| EP | 0717114 | A2 | | 6/1996 | |
| EP | 0607554 | B1 | * | 5/1997 | C14C 3/08 |
| EP | 1029930 | A1 | | 8/2000 | |
| JP | H06212200 | A | | 8/1994 | |
| JP | 2008232000 | A | | 10/2008 | |
| RU | 2039086 | C1 | | 7/1995 | |
| RU | 2149901 | C1 | | 5/2000 | |
| WO | 2005038058 | A1 | | 4/2005 | |
| WO | WO-2013093098 | A1 | * | 6/2013 | C08B 31/18 |
| WO | 2017009786 | A1 | | 1/2017 | |

OTHER PUBLICATIONS https://patents.google.com/patent/EP0607554B1/en (Year: 1997).*

Japanese Office Action in corresponding Japanese Application No. 2018-502182 (with English-language translation) mailed on Aug. 3, 2020, 8 pages.

Russian Search Report (with English translation) in corresponding Russian Application No. 2018103258/10 dated Jan. 28, 2020, 4 pages.

Russian Office Action (with English translation) in corresponding Russian Application No. 2018103258/10 dated Jan. 29, 2020, 9 pages.

Russian Decision to Grant (with English translation) in corresponding Russian Application No. 2018103258/10 dated May 26, 2020, 9 pages.

International Search Report and Written Opinion dated Oct. 18, 2016, in corresponding PCT Application No. PCT/IB2016/054178, 9 pages.

"Tanning leather", The Leather Dictionary (www.leather-dictionary.com), downloaded Apr. 29, 2020, 10 pages.

International Search Report and Written Opinion mailed on Dec. 12, 2018, in International Application No. PCT/IB2018/056353, 15 pages.

Database WPI, CN 101525673 A, XP-002778298, Sep. 9, 2009, 2 pages.

Unknown, "Sodium Chloride Table", Brine Maker, www.Brinemaker.com, Jan. 31, 2019, 1 page.

Chinese Office Action in Chinese Application No. 201680040935.X dated Aug. 8, 2019, 13 pages (with English-language translation).

Indian First Office Action dated Aug. 31, 2021, in corresponding Indian Application No. 202047011581, with English-language translation (6 pages).

Chakraborty et al. "Studies on the Tanning with Glutaraldehyde as an Alternative to Traditional Chrome Tanning System for the Production of Chrome Free Leather," Bangladesh J. Sci. Ind. Res., vol. 43(4), pp. 553-558 (2008).

"Tanning Chemstry," with English-language translation, 10 pages.

First Chinese Office Action in Chinese Application No. 201880054245.9 dated Jun. 21, 2021, 14 pages (with English-language translation).

Second Chinese Office Action in Chinese Application No. 201880054245.9 dated Dec. 13, 2021, 5 pages.

Japanese Office Action in corresponding Japanese Application No. 2020-510129 (with English-language translation) mailed on Mar. 22, 2023, 6 pages.

"Tanning Chemstry," with English-language translation, 10 pages, May 2018.

Zhang, Xiaonan Dai Lijun Xu Lingling, "Gong ye pin shang pin xue," China Logistics Publishing House, Apr. 2006, with English-language machine translation, 5 pages.

* cited by examiner

METHODS FOR TANNING ANIMAL SKINS WITH DIALDEHYDES

CROSS-REFERENCE TO RELATED APPLICATION(S)

This application is a national stage entry from International Application No. PCT/IB2018/056353, filed on Aug. 22, 2018, in the Receiving Office ("RO/IB") of the International Bureau of the World Intellectual Property Organization ("WIPO"), published as International Publication No. WO 2019/038691 A1 on Feb. 28, 2019; International Application No. PCT/IB2018/056353 claims priority under 35 U.S.C. § 119 from Italian Patent Application No. 102017000095318, filed on Aug. 23, 2017, in the Italian Patent and Trademark Office ("IPTO"), the entire contents of all of which are incorporated herein by reference.

The present invention relates to a method for tanning an animal skin.

The tanning method of the present invention can advantageously be used to tan an animal skin, obtaining a leather with few superficial defects (e.g. veins). The tanning method according to the present invention also allows to obtain a leather with relatively high thickness and with higher superficial yields than prior art methods even starting from low weight skins. The tanning method according to the invention also has a low environmental impact because it uses aldehyde tanning agents and does not require the use of chromium tanning agents.

The production of luxury leather goods, such as shoes, bags and garments, requires use of high quality leather, i.e. a leather that is as free of superficial defects as possible. In particular, the leather processed to produce luxury leather items must be as free of veins as possible.

The quality of leather depends mainly on the quality of the starting rawhide, which has to be, insofar as possible, free of defects, such as scars deriving from infections or parasites, incisions deriving from branding operations on the animals, etc.

The visibility of veins and stretch marks on the surface of the leather can be partially reduced in the tanning cycle, for example by adopting particular precautions in the operations of liming, dehairing or bating. Minor leather defects, moreover, can be eliminated or concealed by mechanical finishing operations (e.g. grinding, applying filler).

However, it is not possible to fully eliminate superficial leather defects with the tanning cycle, only a small fraction of available rawhides is then used in the sector of luxury leather goods, which is thus affected by a severe dearth of raw material.

Another important characteristic that leather must have in order to be useable in the production of luxury leather goods is the relatively high thickness. Leather thickness depends mainly on the type of animal, on sex, age, and, to a lesser extent, on the characteristics of the tanning cycle applied. For example, leather of bovine origin is generally obtained with thicknesses in the 0.9 mm-1.4 mm range. However, only leather with thickness in the 1.1-1.4 mm range is used for luxury leather goods.

Rawhides to be tanned are generally classified, based on the age of the animal, in terms of weight ranges. In practice, it is observed that, for the same weight range of a rawhide, a tanning cycle able to produce a high-thickness leather is generally characterised by a relatively low area yield. On the contrary, a tanning cycle that produces a low-thickness leather is characterised by a relatively high area yield. Moreover, for equal tanning cycles, the area yield decreases as the weight range of the rawhide used increases. For example, starting from a bovine rawhide with weight range 12-14 kg, it is possible to obtain a leather with thickness of 1.4 mm with an average area yield of approximately 1.8 square feet per kg of rawhide; starting from a bovine rawhide with weight range 14-16 kg, the same leather with thickness of 1.4 mm can be obtained with an average area yield of 1.6 square feet per kg of rawhide. In addition, it is observed that leather with high thickness (e.g. 1.2 mm-1.4 mm) is not easily obtainable from rawhides with low weight range (e.g. 10-12 kg).

Because of the aforesaid relationship between leather thickness and area yield of the tanning process, it is evident that to have available a high thickness leather it is necessary to apply the tanning cycle mainly to the rawhides with higher weight range which, however, in addition to entailing a lower area yield of the tanning process, have a higher cost than rawhides with lower weight range. For manufacturers of leather goods using high-thickness leather, this entails significant problems of cost and procurement of the raw material.

The tanning cycle or process is the set of manual, mechanical and chemical-physical treatments whereby an animal hide is transformed into leather in order to preserve it or to process it further to manufacture other products.

In general, the tanning cycle includes the following operating steps: a preliminary step of preparing the rawhide for tanning (beamhouse operations); an actual tanning step to make the skin imputrescible; a retanning step, in which the aesthetic and product characteristics of the tanned skin are modified as desired; a finishing step directed at improving or modifying the performance, the appearance and grain of the final leather.

The tanning step is carried out treating the rawhide with mineral, vegetable or synthetic (syntan) tanning agents. One class of tanning agents that is highly used in the art is that of aldehydes. Aldehydes, and in particular glutaraldehyde (1,5-pentanedial), are generally used as tanning agents for rawhide pre-tanning. The main purpose of pre-tanning is to provide the leather with a certain degree of stability to hydrothermal treatments, so as to allow more effective fat removal treatments, at higher temperatures. Aldehyde tanning agents are also used in the retanning step to provide the final leather with more fullness and compactness, or as secondary tanning agents in chrome tanning to promote the skin tanning reaction on the part of the compounds of chromium.

Although aldehydes are a valid alternative to the use of chromium tanning agents because of their reduced environmental impact compared to the latter, aldehydes are generally not used as a single tanning agent to tan skins because they do not allow the attainment of particularly high shrinkage temperatures (Tc) (generally no higher than approximately 80° C.). Moreover, tanning with aldehydes, in particularly when they are used in relatively high concentrations, can produce superficial defects in the skin (e.g. wrinkles) due to the high astringent effect of these tanning agents.

WO 2017/009786 by the same Applicant describes an improved method for tanning an animal skin based on the treatment of the skin in a tanning bath containing a $C_2$-$C_8$ aliphatic dialdehyde and a non-ionic surfactant. In an embodiment, the method also comprises an additional step of treating the skin in a tanning bath comprising only the aforesaid dialdehyde, in substantial absence of the aforesaid non-ionic surfactant. The aforesaid tanning method allows to obtain a leather having a relatively high Tc and high mechanical resistance, without using chromium tanning agents.

In consideration of the aforesaid state of the art, the Applicant set out as the primary objective of providing a method for treating an animal skin that allows to overcome one or more of the drawbacks of the state of the art, illustrated above.

In particular, within said primary objective, a purpose of the present invention is to provide a method for treating an animal skin that allows to obtain a leather with few superficial defects, in particular veins.

A second purpose of the present invention is to provide a method for treating an animal skin with which it is possible to obtain a leather with high thickness, preferably with high area yields.

A third purpose of the present invention is to provide a method for tanning an animal skin using aldehyde tanning agents as the sole tanning agents, which allows to prevent additional tanning treatments with non-aldehyde tanning agents, in particular chromium tanning agents.

The Applicant has found that these and other purposes, which will be illustrated better in the following description, can be achieved by subjecting an animal skin to a tanning treatment with aldehyde tanning agents according to a process that comprises at least two successive stages of treatment of the skin in respective tanning baths, each of which containing at least one aldehyde tanning agent, in substantial absence of surfactants.

The Applicant has indeed observed that by appropriately adjusting the pH at the end of a tanning treatment with aldehyde tanning agents, a tanned skin is obtained that has good hydrothermal stability and is substantially free of superficial defects, such as the wrinkles typically observable in known methods of tanning with aldehydes. The skin obtained after the first stage of tanning treatment is then suitable for being subjected to one or more additional tanning treatments with aldehyde tanning agents. The execution of two or more successive tanning steps with aldehyde tanning agents allows to obtain a complete cross-linking of collagen (high Tc) and, at the same time, a final leather having few superficial defects.

The tanning method according to the invention allows to reduce the number of superficial defects visible on the final leather, in particular in the case of leather obtained from bovine skin and, especially, from calf skins and young calf skins. The best results in terms of defect-free surface are observed on the grain side of the skin.

The effectiveness of the tanning treatment according to the invention, moreover, is such as to make possible the production of high quality leather, with few visible superficial defects, in particular veins, even starting from low quality rawhides.

Skins treated with the tanning method according to the present invention do not require additional treatments with non-aldehyde tanning agents, in particular chromium tanning agents, such as pretanning, tanning and retanning treatments.

The method according to the present invention, moreover, allows to obtain leather with high thickness, even exceeding 1.4 mm, even starting from rawhides with low weight, and with high area yields.

The present invention then allows to provide high-quality leather in a simple and economical manner and with reduced environmental impact.

In accordance with a first aspect, the present invention relates to a method for tanning an animal skin comprising the steps of:

(a) placing said animal skin in contact with a first tanning bath comprising at least one dialdehyde with the general formula (I)

$$O{=}CH{-}(CH_2)_n{-}HC{=}O$$

where n is 0 or an integer in the range 1-8, said tanning bath having a pH in the range 1-5;

(b) bringing the pH of the tanning bath to a pH higher than 5 and lower than 8;

(c) repeating one or more times said steps (a) and (b) on said skin coming from said step (b) using a second or further tanning bath;

said first, second and further tanning bath being substantially free from surfactants.

For the purposes of the present description and of the annexed claims, the verb "to comprise" and the terms deriving therefrom also include the verb "to consist of" and "to consist essentially of", as well as the terms deriving therefrom.

The dialdehyde of general formula (I) is an aliphatic dialdehyde selected preferably from: glyoxal, malonic dialdehyde, succinic dialdehyde, glutardialdehyde, adipic dialdehyde and pimelic dialdehyde or mixtures thereof. Preferably, the dialdehyde of general formula (I) is glutardialdehyde.

The tanning bath can comprise one or more dialdehydes of general formula (I).

The total quantity of dialdehyde of general formula (I) in the tanning bath is in the range 0.1%-30% by weight referred to the weight of the pelt, preferably in the range 0.5%-15% by weight.

For the purposes of the present invention and of the annexed claims, the expression "pelt" indicates the weight of the skin in the state in which it is subjected to the first treatment with aldehyde tanning agent (step a) according to the present invention.

The tanning bath can also contain auxiliary tanning agents different from the dialdehyde of general formula (I). Where present, the total concentration of the auxiliary tanning agents preferably does not exceed 30% by weight referred to the weight of the pelt. Preferably, the auxiliary tanning agents do not include chromium tanning agents. Preferably, to the tanning bath are not added auxiliary tanning agents.

In accordance with the present invention, the tanning bath is substantially free of non-ionic surfactants. For the purposes of the present description and of the annexed claims, the expression "substantially free of surfactants" indicates that surfactants are present in a total quantity lower than 0.05% by weight relative to the weight of the pelt.

However, the tanning bath can also comprise one or more additional surfactants, for example if skins having a relatively high fat content are treated. Surfactants can be anionic, cationic, non-ionic and amphiphilic. Preferably, any surfactants present are non-ionic surfactants, such as for example the surfactants described in WO 2017/009786.

Preferably, no surfactant is added to the tanning bath.

The tanning bath preferably has a density in the range 3-10° Bé. The density of the bath can be adjusted by addition of salts of alkaline and alkaline-earth metals, in particular sodium chloride.

The treatment in the tanning bath preferably has a duration of 1-7 hours, more preferably 1.5-5 hours.

The temperature of the tanning bath is preferably in the range 10-50° C., more preferably 15-40° C.

The quantity of tanning bath to be used can vary within a broad range in relation to the characteristics of the skin to be treated.

Preferably, the ratio by weight in percentage terms between the tanning bath and the animal skin is in the 20%-1000% range, more preferably in the range 50%-600% (percentage by weight referred to the weight of the pelt). At the start of the treatment, the tanning bath preferably has a pH in the range 1-4, more preferably in the range 1.5-3.5.

In accordance with the present invention, at the end of the treatment with the aldehyde tanning agent (step a) the pH of the tanning bath is brought to a value above 5 and below 8 (step b); preferably the pH is brought to a value equal to or higher than 5.5 and equal to or lower than 7.5; in a particularly preferred embodiment, the pH is brought to a value equal to or higher than 6 and equal to or lower than 7.

Raising the pH of the tanning bath to a value in the aforesaid range allows to fix the aldehyde tanning agent to the skin in a substantially permanent manner. Hereinafter, the value of pH of the bath in step b is also called "fixing pH."

The pH of the tanning bath to the fixing value can be raised with the methods known to the person skilled in the art, for example by adding to the tanning bath alkali carbonates and alkali oxides, such as sodium carbonate or bicarbonate, magnesium oxide, etc.

Preferably, the skin is maintained in the bath at the fixing pH for a time in the range from 0.5 hours to 5 hours, more preferably from 1 hour to 3 hours.

After fixing the tanning agent to the skin (step b), the skin is subjected to at least a second treatment cycle comprising the steps a and b described above. To accomplish the second treatment cycle, for example, the first exhausted tanning bath can be replaced with a second fresh tanning bath having the initial characteristics of the first tanning bath, described above. The treatment with the aldehyde tanning agent in the second tanning bath is then followed by raising the pH to the fixing pH value. The steps a and b of the second treatment cycle are carried out with the same procedures illustrated with reference to the first treatment cycle.

The second treatment cycle allows to complete the cross-linking of the polypeptide chains of the collagen of the animal skin, substantially reaching the maximum shrinkage temperature Tc. The Tc of the skin after the tanning treatment according to the present invention varies mainly according to the type of skin and to the specific aldehyde tanning agent used. Typically, after the second treatment cycle, the Tc of the tanned skin is generally equal to or higher than 85° C., preferably equal to or higher than 90° C., more preferably in the range between 85° C. and 95° C.

In accordance with the present invention, optionally, the skin exiting the second treatment cycle can be subjected to one or more additional treatment cycles comprising the steps a and b described above. Advantageously, additional treatment cycles can be carried out if the Tc reached after a certain number of treatment cycles (e.g. 1 or 2 cycles) is not sufficiently high.

In general, it is observed that treatment cycles following the third one do not lead to significant improvements of the Tc and of the other characteristics of the tanned skin.

The tanning baths used in the optional treatment cycles have the same initial chemical composition of the first tanning bath and are used in the same way. The steps a and b of the optional treatment cycles are carried out with the same procedures illustrated with reference to the first and second treatment cycles.

At the end of a treatment cycle, the skin can be optionally subjected to washing with water for the purpose, for example, of eliminating any residues or impurities that were deposited on the skin during the treatment.

Preferably, washing is carried out in a water bath at a temperature in the 20-60° C. range, more preferably in the 30-50° C. range. Washing can be carried out once or several times. Each washing step can have a duration in the 0.5-4 hours range.

The tanning method according to the present invention can be applied to skins of different animal origin. The skin is preferably selected from: bovine skin, sheep skin, goat skin and reptile skin (e.g. crocodile, snake).

In a preferred embodiment, the animal skin is a bovine skin, more preferably a calf or young calf skin.

The skins to be treated with the tanning method according to the present invention are unpaired skins, ready for tanning. For this purpose, the skins can be prepared in accordance with the processes known to the person skilled in the art, subjecting them, for example, to beamhouse operations, such as: soaking, fleshing, dehairing, liming, splitting, deliming, bating, pickling and degreasing.

In accordance with a preferred embodiment, the skin to be subjected to tanning treatment according to the present invention can be previously subjected to a pickling treatment to bring the pH of the skin, for example, to a value below 4, preferably in the range of 1 to 3.

The pickling step can be accomplished in accordance with the techniques known in the art. For example, pickling can be carried out placing the skin in contact with a pickling bath containing an aqueous solution of sulphuric acid, possibly mixed with formic acid. When necessary, for example in the case of skins to be pickled until the pH is lower than 2, the pickling bath can contain salts (e.g. sodium chloride) to increase the density of the solution and prevent the skin from swelling. Typically, the pickling bath has a density in the range from 3 to 15° Be.

However, since the skins treated with the method according to the present invention are substantially tanned in a complete manner, the method according to the present invention preferably does not comprise any step of pretanning, tanning or retanning with non-aldehyde tanning agents, in particular tanning agents containing chromium.

At the end of the second or additional treatment cycle, the tanned and optionally washed skin may possibly be subjected to one or more subsequent finishing steps, such as a step of fatliquoring or dyeing.

The fatliquoring step can be carried out in accordance with the prior art. For example, the fatliquoring step can be carried out by placing the skins tanned in a bath of water comprising at least one grease and/or one fatliquor (e.g. sulphated oils) and possibly one or more surfactants. Preferably, fatliquoring is carried out at a temperature in the range from 20° C. to 60° C., more preferably in the range from 30° C. to 50° C.

The fatliquoring treatment preferably has a duration in the range from 0.5 to 4 hours.

Preferably, at the end of the fatliquoring treatment, to fix the fatliquor to the skin, formic acid is added to the fatliquoring bath until the pH of the bath is lowered to a value in the range from 3 to 6.

The tanning method according to the present invention can be carried out using the techniques and the devices that are known to the person skilled in the art. For example, the skin to be treated can be placed in contact with the aldehyde tanning agent of the tanning bath in a drum.

The following embodiment examples are provided merely to illustrate the present invention and should not be construed in a sense that would limit the scope of protection defined by the attached claims.

Figure 2:
Figure 3:

In the following examples, reference will be made to the accompanying figures, which illustrate:

FIG. 1, a photographic image of the surface of a first leather obtained with the tanning method according to the present invention;

FIG. 2, a photographic image of the surface of a second leather obtained with the tanning method according to the present invention;

FIG. 3, a photographic image of the surface of a leather obtained with a conventional chrome tanning method.

EXAMPLE 1

A first Dutch calf rawhide (pickled) included in a batch of weight range 11-13 was subjected to a tanning treatment in accordance with the method of the present invention.

The first tanning bath had the following composition (percentages by weight referred to the pelt weight of the treated skin):

water, 1.5% of glutaraldehyde, pH=3

9° Bé (by addition of sodium chloride).

The skin was treated in the tanning bath (step a) for 4 hours at 25° C. in a drum. The percentage ratio between the weight of the water of the tanning bath and the pelt weight was equal to 400%.

At the end of the treatment, sodium carbonate was added to the bath until the pH of the bath was adjusted to a value of approximately 6.5. The skin was maintained in the bath at the aforesaid pH for 1.5 hours to allow fixing the aldehyde tanning agent (step b).

At the end of the aforesaid steps a and b (first treatment cycle), the exhausted first tanning bath was removed from the drum and replaced with a second tanning bath having the same composition as the first tanning bath. The second tanning bath was used in the same weight ratio with respect to the pelt weight of the treated skin. The steps a and b described above were then repeated once (second treatment cycle).

At the end of the second treatment cycle, the tanned skin had the following characteristics:

Tc=90° C., thickness 1.7 mm, area yield of the process equal to approximately 2.2 $ft^2/kg$.

The grain side of the leather had few visible superficial defects as shown in FIG. 1.

EXAMPLE 2

A second Dutch calf raw hide included in the same batch as the skin of Example 1 was subjected to the same tanning treatment described in Example 1. For this second skin, the same results of Tc, skin thickness and area yield of the process observed in Example 1 were obtained. This demonstrates the reproducibility of the results of the process according to the previous invention.

The grain side of the leather had few visible superficial defects as shown in FIG. 2.

EXAMPLE 3

By way of comparison, the Dutch calf raw hide used in Example 1 was subjected to a conventional chrome tanning treatment.

The chrome tanned skin had the following characteristics:

Tc=100° C., thickness 1.3 mm, area yield of the process equal to approximately 1.9 $ft^2/kg$.

The grain side of the leather had a higher quantity of visible superficial defects than those of the leather of Examples 1 and 2, as shown in FIG. 3.

The thickness of the leather obtained with the method according to the present invention (Examples 1 and 2) is approximately 30% greater than the thickness of the leather obtained subjecting the same raw hide to a traditional chrome tanning process.

Moreover, the area yield of the raw hide treated with the method according to the present invention is approximately 15% greater than the area yield of the chrome tanning method.

The invention claimed is:

1. A method for tanning an animal skin, the method comprising:

(a) putting the animal skin in contact with a first tanning bath, wherein prior to contact with the animal skin, the first tanning bath comprises at least one dialdehyde of general formula (I)

$$O{=}CH{-}(CH_2)_n{-}HC{=}O \quad (I),$$

wherein n is 0 or an integer number greater than or equal to 1 and less than or equal to 8, and wherein the first tanning bath has a pH greater than or equal to 1 and less than or equal to 5;

(b) bringing the pH of the first tanning bath to a pH greater than 5 and less than 8;

(c) removing the animal skin in its entirety from contact with the first tanning bath;

(d) putting the animal skin in contact with a second tanning bath, wherein prior to contact with the animal skin, the second tanning bath comprises the at least one dialdehyde of the general formula (I)

$$O{=}CH{-}(CH_2)_n{-}HC{-}O \quad (I),$$

wherein n is 0 or an integer number greater than or equal to 1 and less than or equal to 8, and wherein the second tanning bath has a pH greater than or equal to 1 and less than or equal to 5;

(e) bringing the pH of the second tanning bath to a pH greater than 5 and less than 8; and (f) removing the animal skin in its entirety from contact with the second tanning bath;

wherein in the first and second tanning baths, surfactants are present in a total quantity less than 0.05% by weight relative to a pelt weight of the animal skin, and wherein the first tanning bath is different from the second tanning bath.

2. The method of claim 1, wherein prior to contact with the animal skin, the at least one dialdehyde of the general formula (I) is present in the first and second tanning baths in an amount greater than or equal to 0.1% by weight and less than or equal to 30% by weight with respect to the pelt weight of the animal skin.

3. The method of claim 1, wherein the pH of the first tanning bath in the step (b) is brought to greater than or equal to 5.5 and less than or equal to 7.5.

4. The method of claim 1, wherein the at least one dialdehyde of the general formula (I) is selected from: glyoxal, malonic dialdehyde, succinic dialdehyde, glutardialdehyde, adipinic dialdehyde, pimelic dialdehyde, or mixtures thereof.

5. The method of claim 1, wherein the at least one dialdehyde of the general formula (I) is glutardialdehyde.

6. The method of claim 1, wherein the step (a) has duration greater than or equal to 1 hour and less than or equal to 7 hours.

7. The method of claim 1, wherein a weight percentage ratio of the first tanning bath of the step (a) to the animal skin is greater than or equal to 1:5 and less than or equal to 10:1.

8. The method of claim 1, wherein the method does not use any tanning agent different from the at least one dialdehyde of the general formula (I).

9. The method of claim 1, wherein the animal skin is selected from: cowhide, sheepskin, goatskin, and reptile skin.

10. The method of claim 1, wherein prior to contact with the animal skin, the at least one dialdehyde of the general formula (I) is present in the first and second tanning baths in an amount greater than or equal to 0.5% by weight and less than or equal to 15% by weight with respect to the pelt weight of the animal skin.

11. The method of claim 1, wherein the at least one dialdehyde of the general formula (I) comprises glutardialdehyde.

12. The method of claim 1, wherein the animal skin is calf skin or baby calf skin.

13. The method of claim 1, wherein the method does not use any non-aldehyde tanning agents.

14. The method of claim 1, wherein the method does not use any chromium tanning agents.

15. A method for tanning an animal skin, the method comprising:

(a) putting the animal skin in contact with a first tanning bath, wherein prior to contact with the animal skin, the first tanning bath consists essentially of at least one dialdehyde of general formula (I)

$$O{=}CH{-}(CH_2)_n{-}HC{=}O \quad (I),$$

wherein n is 0 or an integer number greater than or equal to 1 and less than or equal to 8, and wherein the first tanning bath has a pH greater than or equal to 1 and less than or equal to 5;

(b) bringing the pH of the first tanning bath to a pH greater than 5 and less than 8;

(c) removing the animal skin in its entirety from contact with the first tanning bath;

(d) putting the animal skin in contact with a second tanning bath, wherein prior to contact with the animal skin, the second tanning bath consists essentially of the at least one dialdehyde of the general formula (I)

$$O{=}CH{-}(CH_2)_n{-}HC{=}O \quad (I),$$

wherein n is 0 or an integer number greater than or equal to 1 and less than or equal to 8, and wherein the second tanning bath has a pH greater than or equal to 1 and less than or equal to 5;

(e) bringing the pH of the second tanning bath to a pH greater than 5 and less than 8; and (f) removing the animal skin in its entirety from contact with the second tanning bath;

wherein in the first and second tanning baths, surfactants are present in a total quantity less than 0.05% by weight relative to a pelt weight of the animal skin, and wherein the first tanning bath is different from the second tanning bath.

16. The method of claim 15, wherein the at least one dialdehyde of the general formula (I) is selected from: glyoxal, malonic dialdehyde, succinic dialdehyde, glutardialdehyde, adipinic dialdehyde, pimelic dialdehyde, or mixtures thereof.

17. The method of claim 15, wherein the at least one dialdehyde of the general formula (I) is glutardialdehyde.

18. The method of claim 15, wherein the method does not use any tanning agent different from the at least one dialdehyde of the general formula (I).

19. The method of claim 15, wherein the method does not use any non-aldehyde tanning agents.

20. The method of claim 15, wherein the method does not use any chromium tanning agents.

* * * * *